Feb. 1, 1927.

F. GELSTHARP 1,615,832

GLASS MELTING TANK

Filed Aug. 18, 1923

2 Sheets-Sheet 1

INVENTOR
Frederick Gelstharp
by
James C. Bradley
Atty

Feb. 1, 1927.　　　F. GELSTHARP　　　1,615,832

GLASS MELTING TANK

Filed Aug. 18, 1923　　　2 Sheets-Sheet 2

Patented Feb. 1, 1927.

1,615,832

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

GLASS-MELTING TANK.

Application filed August 18, 1923. Serial No. 658,159.

Figure 1:
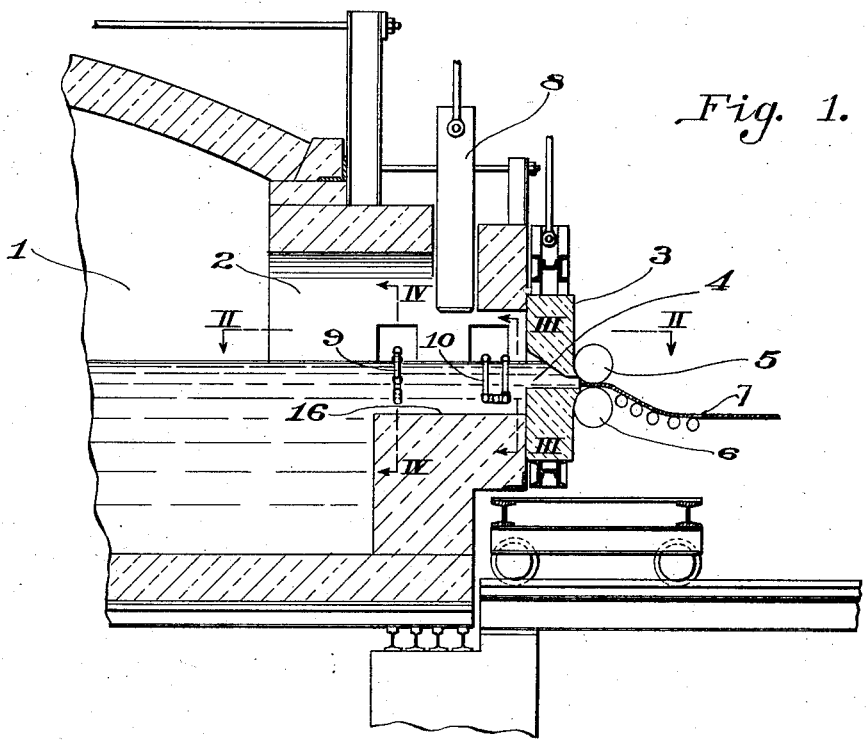
Figure 2:
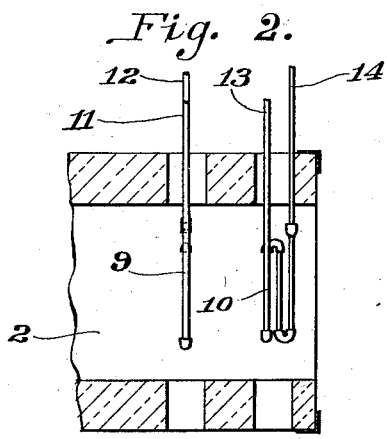
Figure 3:
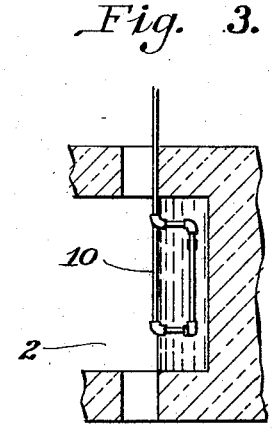
Figure 4:
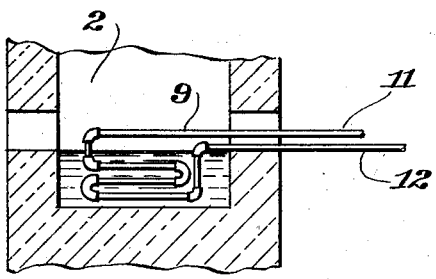

The invention relates to glass tanks, and particularly to those designed for continuous operation in which the glass is melted in one end or portion and withdrawn from the other. Such a tank may or may not have a "forehearth", or shallow extension at its withdrawal or outlet end, and the invention is applicable to either type, although it has special advantages, as hereinafter pointed out, when applied to the type employing the forehearth. The invention has for one of its objects the provision of means whereby a high temperature may be maintained at one end of the tank for melting, with a comparatively cool working condition at the withdrawing end without having to sacrifice the rate of melting, and without providing an excessively long cooling end. By the use of the arrangement, the length of the withdrawing end may be materially shortened. The shortening of the withdrawing end is of advantage for several reasons, one being the reduced cost of construction and upkeep, and another, and more important one being the reduction in the contamination of the glass, incident to the wash of the clay by the glass, which increases in proportion to the area over which the glass flows. A further object is the provision of means whereby the formation of rehm in the glass incident to the wash of the glass over the clay bottom of the forehearth is avoided. Certain embodiments of the invention are illustrated in the accompanying drawings wherein:

Figure 1 is a vertical section through the apparatus. Fig. 2 is a section on the line II—II of Fig. 1. Fig. 3 is a section on the line III—III of Fig. 1. Fig. 4 is a section on the line IV—IV of Fig. 1 and Fig. 5 is a section corresponding to that of Fig. 4 but illustrating a modification.

Referring to Fig. 1, the reference numeral 1 designates a portion of a continuous glass melting tank provided with an outlet end 2 in the form of a "forehearth", or extension. The forward end of this forehearth is closed by means of the clay block 3 having the outlet passage 4 discharging between a pair of water cooled sheet forming rolls 5 and 6. The particular means for forming the sheet 7, including the rolls 5 and 6, constitutes no part of my present invention, such construction being indicated more fully in my copending application Serial Number 656,441. To the rear of the outlet passage 4 is a cut off gate 8 supported for vertical movement.

Also located to the rear of the outlet passage 4 and submerged in the glass are a pair of cooling devices 9 and 10 preferably in the form of coils of pipe, indicated more clearly in Figs. 2 and 4. The coil 9 is provided with the inlet and outlet branches 11 and 12, while the coil 10 has the inlet and outlet ends 13 and 14, so that a circulation of liquid may be secured in order to provide the desired cooling effect.

Figure 5:
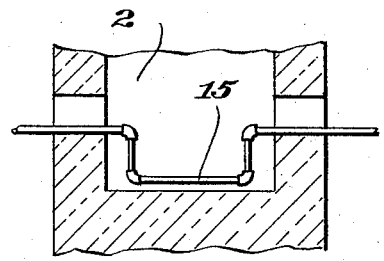

Fig. 5 illustrates a modification in which the pipe 15 takes the place of the coil 9, thus confining the cooling effect to the glass closely adjacent the bottom of the forehearth. The arrangement and number of coils of pipe may be variously arranged to suit the requirements.

The use of the cooling elements 9 and 10 in the outlet or withdrawing end of the tank permits of the regulation of the temperature of the glass in the outlet end, so that it may be supplied to the rolls to form the sheet, at a temperature just suited to give the desired results. They also permit a relatively cool temperature to be maintained in the outlet end of the tank while running the melting end at a high temperature, and this result is secured without lengthening the outlet or cooling end of the tank. The capacity of the tank may, therefore, be maintained while using the relatively short forehearth or cooling end, which is advantageous from the standpoint of construction cost and upkeep, and, further, because rehm in the glass is reduced. The use of the cooling elements also tend to reduce the wash of the clay from the bottom 16 of the forehearth since the glass adjacent the bottom is rendered more viscous and the current of incoming glass instead of passing along the bottom passes along a level above the bottom, thus reducing the tendency toward the formation of rehm in the glass.

What I claim is:

1. In combination in a glass tank having a melting end and a withdrawing end provided with an outlet from which the glass is withdrawn or fed under the head pressure of the tank, of a metal cooling pipe submerged in the glass at the withdrawing end, but spaced away from said outlet, and means for circulating a cooling fluid therethrough.

2. In combination in a glass tank having a melting end and a withdrawing end provided with an outlet from which the glass is withdrawn or fed under the head pressure of the tank, of a cooling element in the form of pipe coils submerged in the glass at the withdrawing end, but spaced away from said outlet, and means for circulating a cooling fluid therethrough.

3. In combination in a glass tank having a melting end and a withdrawing end provided with an outlet from which the glass is withdrawn or fed under the head pressure of the tank, of a metal cooling pipe submerged in the glass at the withdrawing end, and entirely surrounded thereby, but spaced away from said outlet, and means for circulating a cooling fluid therethrough.

In testimony whereof, I have hereunto subscribed my name this 3rd day of August, 1923.

FREDERICK GELSTHARP.